3,299,182
HIGH IMPACT, HEAT AND CHEMICAL RESISTANT BLENDS OF CHLORINATED POLYVINYL CHLORIDE AND CHLORINATED POLYETHYLENE
Garland B. Jennings, Avon, and George J. Kliner, Avon Lake, Ohio, assignors to The B. F. Goodrich Company, New York, N.Y., a corporation of New York
No Drawing. Filed May 5, 1961, Ser. No. 107,929
7 Claims. (Cl. 260—897)

This invention relates to novel polymer mixtures comprising a major proportion of a post-chlorinated polyvinyl chloride and a minor proportion of a homogeneously chlorinated linear polyolefin and to a method for preparing said polymer mixtures.

There is a need for a plastic material which is serviceable at temperatures in excess of that of boiling water. There is also a need for a plastic material which in addition to being of high softening point and heat stability is impact- and shock-resistant and is also resistant to corrosive liquids and chemicals.

It is an object of this invention, therefore, to provide a novel thermoplastic composition having excellent impact resistance, high heat distortion temperature and unusually good resistance to degradation by heat and corrosive liquids and chemicals.

Still further objects and advantages of the present invention will appear from the more detailed description set forth below, it being understood that such detailed description is given by way of illustration and explanation only, and not by way of limitation, since various changes therein may be made by those skilled in the art without departing from the scope and spirit of the present invention.

We have discovered a novel composition comprising a mixture of a major proportion of a post-chlorinated polyvinyl chloride and a minor proportion of a homogeneously chlorinated polyolefin.

The post-chlorinated polyvinyl chlorides most useful in the present invention are those having densities in the range of from about 1.53 to about 1.59 (that is to say, those containing of from above 64% by weight up to 68% by weight of chlorine), ASTM heat distortion temperatures of from at least 95° C. to about 125° C., and being substantially insoluble in acetone and completely soluble in tetrahydrofuran. Most preferred are those post-chlorinated polyvinyl chlorides having densities of from 1.55 to 1.58 g./cc. at 25° C., and heat distortion temperatures of at least 100° C. according to ASTM Test Method D-648. The post-chlorinated polyvinyl chlorides embodied herein are not degraded in the unstabilized condition when heated in air for ten minutes at 375° F. The copending U.S. patent applications Serial No. 707,672 of Mark L. Dannis and Floyd L. Ramp filed January 8, 1958, and now U.S. Patent No. 2,996,489, and Serial No. 101,654 of Joseph C. Shockney filed April 10, 1961, now U.S. Patent No. 3,100,762, describe these post-chlorinated polyvinyl chloride resins and methods for preparing them in more detail. These post-chlorinated polyvinyl chloride resins are characterized by having heat distortion temperatures, as measured by ASTM Test Method D-648, which are at least 20° C. higher than those of unchlorinated polyvinyl chloride resins.

The halogenated polyolefins useful in this invention are those prepared from so-called "high pressure polyolefins" as set out, for instance, in U.S. Patents 2,183,556; 2,398,803; 2,481,188; 2,422,919; 2,592,763; 2,695,899; 2,784,105 and in the book "Polythene: The Technology and Uses of Ethylene Polymers" by Renfrew and Morgan, 2nd edition, Interscience Publishers, New York, 1960, pages 391–396.

Even more preferred are the halogenated polyolefins prepared from so-called "low pressure," high density polyolefins such as those prepared at pressures below about 500 atmospheres as described in U.S. Patents 2,890,213; 2,913,499; 2,920,062; 2,920,064; 2,959,562 and 2,964,514 as well as in British Patents 828,379 and 834,824.

The polyolefins which are normally solid polymers and copolymers of ethylene, propylene and other aliphatic alpha-olefins having a maximum chain length of 8 carbon atoms and having no chain branching nearer the double bond than the 4-position are preferred. Most preferred for the purposes of this invention are the homogeneously chlorinated "low pressure," high density, relatively high molecular weight, linear polyethylenes described in the foregoing patents and in the copending U.S. patent application Serial No. 106,477 of M. Peter Dreyfuss and Floyd L. Ramp, filed May 1, 1961, now abandoned, and U.S. Patent No. 3,035,038.

Generally speaking, the low pressure, high density polyethylenes used as starting materials for the preferred chlorinated polyethylenes of the present invention are those prepared at pressures of less than 500 atmospheres.

The chlorinated polyethylene which is most preferred in the present invention is that resulting from the homogeneous chlorination of a macromolecular polyethylene having substantially linear and unbranched molecular structure and a high apparent molecular weight (as may be determined from observation of such of its intrinsic properties as melt index, ASTM D 1238–57T) in the indicated range and preferably those having melt index values above about 0.05. Most preferred are linear polyethylenes having a melt index of from 0.05 to about 7. Such distinct species and varieties of polyethylene may be prepared, for example, from ethylene according to a process first reported by Dr. Karl Ziegler and his associates in Germany. In this process, an embodiment of which is disclosed in Belgian patent specification No. 533,362, the polymerization is conducted under the influence of catalyst systems that comprise admixtures of compounds of Group IV–A, V–A and VI–A metals of the Periodic System according to Mendeleef, especially titanium and zirconium and reducing agents therefor, such as aluminum alkyls. Relatively low pressures ranging from 1 to 100 atmospheres may be employed when Ziegler catalyst systems are utilized for the polymerization of ethylene.

Other known processes for the manufacture of macromolecular, substantially linear and unbranched polyethylene which may be employed in preparing the homogeneously chlorinated polyethylenes embodied herein are those polyethylenes prepared with such catalysts as chromium oxide on silicated alumina, hexavalent molybdenum compounds and charcoal supported nickel-cobalt. Belgian patent specification No. 530,617 and U.S. Patent No. 2,825,712 as well as the aforementioned book by Renfrew and Morgan, especially pages 8–10 and 17–40 are representative of other art relating to the macromolecular, linear polyethylenes that recently have become available.

The preferred macromolecular, linear polyethylene from which the chlorinated polyethylene for use in the present invention may be derived generally has an apparent molecular weight which is significantly greater than when it is prepared by the older known high pressure methods (such as those in which the monomeric ethylene is polymerized in the presence of polymerization-favoring quantities of oxygen and water having a pH greater than 7 under a pressure of at least 500 and, more usually, 1000 atmospheres and at temperatures of from 150 to 275° C.). The density (ASTM D 1505–57T) of macromolecular linear polyethylene is usually in the neighborhood of from about 0.926 to 0.965 and preferably from 0.941 to 0.965 grams per cubic centimeter and its melting point is usually 125 to 130° C. The ASTM density of plastics is the weight per unit volume of material at 23° C. It is, as has been mentioned, substantially unbranched and linear polymer and may generally be made to contain less than 3 and even less than 0.03 methyl groups per 100 methylene groups in the polymer molecule. Macromolecular, linear polyethylene is also found to be more crystalline than polyethylene prepared by the older conventional high pressure methods. Examples of commercially available polyethylenes useful in this invention may be found in the "Plastics Properties Chart, Part 1, Thermoplastics," under "Polyethylene," in "Modern Plastics Encyclopedia," issue 1960.

The homogeneously chlorinated polyethylene which is blended with the post-chlorinated polyvinyl chloride in the compositions embodied herein should contain from about 5 to 50% and more preferably from about 30 to 40% by weight of chlorine.

The compositions embodied in this invention comprise mixtures of from about 2 to less than 10 parts by weight of the chlorinated polyethylene for each 100 parts by weight of the post-chlorinated polyvinyl chloride. More preferable are the compositions comprising from 5 to 8 parts by weight of homogeneously chlorinated polyethylene per each 100 parts by weight of post-chlorinated polyvinyl chloride. It is indeed unexpected that such small amounts of the homogeneously chlorinated polyethylene would be useful as an impact improver and processing aid in the instant invention. Compositions containing less than the preferred amount of chlorinated polyethylene are difficult to process and have low impact resistance while those having more than the preferred amount have lower softening points, lower heat distortion temperatures and poorer chemical resistance than the preferred compositions.

The compositions embodied herein preferably are free of the conventional plasticizers, processing aids and impact improvers because they can be molded, extruded and calendered as they are. Conventional plasticizers are to be avoided because they lower the heat distortion temperature when they are used in these compositions. It is often desirable, however, to include in the mixture of homogeneously chlorinated polyethylene and post-chlorinated polyvinyl chloride embodied herein small amounts of compounds useful as heat and light stabilizers. Conventional pigments and fillers which are well known in the art of thermoplastics also may be included in the compositions embodied herein.

The impact, heat and chemical resistant compositions of this invention may be prepared by mixing the ingredients on a mill, calender or in a Banbury or other type of internal mixer at a temperature of from about 300 to about 400° F. It is also often convenient to blend the post-chlorinated polyvinyl chloride and chlorinated polyethylene ingredients in solution or dispersion followed by precipitation, coagulation or spray-drying of the blended product. A minimum of additional milling or mixing is then required for the production of homogeneous blends.

The compositions embodied herein have excellent structural properties which make them useful in containers, piping, conduits and the like and in particular in piping and containers used for the transfer or storage of hot and corrosive liquids and chemicals. In fact, the compositions of this invention are useful in most applications in which an article having unusually good resistance to impact, heat and corrosion is required.

The invention will be further described by the following specific examples wherein the amounts of the various ingredients are expressed in parts by weight unless otherwise indicated. It will be understood, however, that although these examples may describe in detail some of the specific features of the invention, they are given primarily for illustrative purposes, the scope of the invention being defined by the appended claims.

*Homogeneously chlorinated polyethylene*

A glass reactor which was equipped with an agitator, a quick opening safety valve and a chlorine inlet port was charged with 55 parts of technical grade carbon tetrachloride, 2.75 parts of polyethylene, and 15 parts of distilled water. The reactor was closed, the agitator was started and a vacuum was applied for about 30 minutes to remove oxygen from the system. The reaction temperature was then brought to 130° C. and maintained for about 1.5 hours. The reactor pressure at this point was about 75 p.s.i. A trace of di-t-butyl peroxide was then added to the reaction mixture and chlorine was next admitted so as to maintain a pressure of about 80 p.s.i. in the reactor during the course of the reaction. During the chlorination the temperature was held between 125 and 130° C. Because of the exothermicity of the reaction, it was necessary to provide some cooling to maintain the desired temperature. The extent of chlorination was controlled by monitoring the weight of chlorine admitted to the reactor. After the desired amount of chlorine had been added, the chlorine inlet valve was closed and the reactor was maintained at 125° C. for an additional 30 minutes so that the residual chlorine could react. Since the reaction involves the replacement of hydrogen atoms of the polymer by chlorine atoms and the formation of HCl as a by-product, the theoretical amount of chlorine used is twice that which is to be introduced into the polymer and the required amount of chlorine may readily be calculated a priori by one skilled in the art.

The cement of chlorinated polyethylene in carbon tetrachloride was removed from the water-HCl mixture, was washed with fresh water and was then added to an excess of methanol to precipitate the product. The product was methanol-washed and vacuum dried. The product was then ready to be mixed with the post-chlorinated polyvinyl chloride. In the foregoing manner the various polyethylenes listed below were chlorinated to levels of from about 30 to 45% by weight of chlorine.

A. A low pressure polyethylene having a density of 0.96 (ASTM D 1505–57T), melt index of 5.0 (ASTM D 1238–57T), a softening temperature of 260° F. (ASTM D 1525–58T) and a Shore "D" hardness of 68.

B. A polyethylene having a density of 0.96, melt index of 0.2, softening temperature of 260° F. and a Shore "D" hardness of 68.

C. A low pressure copolymer of about 95% ethylene and 5% butene having a density of 0.95, melt index of 6.5, softening temperature of 255° F. and a Shore "D" hardness of 67.

D. A copolymer of about 95% ethylene and 5% butene having a density of 0.95, melt index of 0.3, softening temperature of 255° F. and a Shore "D" hardness of 67.

E. A low pressure polyethylene having a density of 0.954 and a melt index of 5.0.

F. A high pressure polyethylene having a density of 0.916 and a melt index of about 4.5.

G. A Ziegler type polyethylene having a melt index of 0.05.

H. A Ziegler type polyethylene having a density of 0.953 and a melt index of 6.0.

I. A Ziegler type polyethylene having a density of 0.955, a melt index of 0.1 and an intrinsic viscosity in alpha-chloro naphthalene at 130° C. of 1.58.

*Post-chlorinated polyvinyl chloride*

Into a glass reactor equipped with a source of ultraviolet light were charged 500 parts by weight of a high quality, commercial grade of high molecular weight polyvinyl chloride (an easy processing, general purpose type of resin having a specific viscosity of about 0.54), 1200 parts of distilled water and 160 parts of chloroform. Preferably, the water-polyvinyl chloride slurry is made up first and allowed to stand for a few hours to insure complete wetting of the polyvinyl chloride particles. Agitation was used during the charging and throughout the chlorination reaction. The reactor was closed and air was purged from the system with nitrogen. The reactor was then evacuated by suction.

The chlorination was carried out by introducing chlorine (always maintaining a slight positive pressure and an excess of chlorine at the surface where the reaction was proceeding) into the reactor while the reaction mixture was maintained in the presence of ultraviolet light at a temperature of 40° C. The theoretical amount of chlorine necessary for a desired given density of product was used. The reaction wherein the amount of chlorine necessary to produce a product having a density of about 1.57 required 310 parts of chlorine and about 7 hours reaction time after which the ultraviolet light was extinguished and the reaction mixture then was cooled rapidly under chlorine pressure. Excess chlorine was immediately purged from the reactor with nitrogen, and the resulting slurry was neutralized with sodium bicarbonate to a pH of 7.2. The solid product which was readily isolated by filtration and drying, was found to have a density of 1.57 grams per cubic centimeter at 25° C., and was insoluble in acetone and soluble in tetrahydrofuran.

EXAMPLE I

A dispersion of chlorinated polyvinyl chloride described above and a cement of chlorinated polyethylene (A) in carbon tetrachloride as described above were co-isolated by adding sufficient of the cement to the dispersion to produce a blend containing 5 parts of chlorinated polyethylene per 100 parts of the chlorinated polyvinyl chloride. (It is sometimes convenient if the chlorinated polyethylene cement is quite viscous to emulsify the cement in water with an emulsifying agent and then to add the cement emulsion to the aqueous suspension of chlorinated polyvinyl chloride.) The resulting slurry was heated to 100° C. to remove the carbon tetrachloride, the slurry was then cooled and filtered and the solid product was washed several times with distilled water to remove last traces of acid. The resin blend was air dried at 150° F. for 24 hours in a glass column (2 inch diameter, 5 feet long) under fluidizing conditions. The dry product was a light tan, free flowing powder.

The foregoing blends were then compounded as follows:

Chlorinated polyethylene chlorinated polyvinyl
  chloride blend _____ 105
Mixed Ba-Cd salt of higher fatty acids _____ 3
Calcium stearate _____ 0.75

The above mixtures were bottle mixed on a roller for 30 minutes.

Each sample was milled at 310° F. on a laboratory roll mill. The samples banded after approximately 2 to 3 minutes and they were allowed to mix at this temperature another 2 or 3 minutes before they were removed as sheets ⅛ inch thick.

Two slabs measuring 5″ x 2″ x ⅛″ were rough cut from the stock for heat distortion and Izod tests, while the remainder of the stock was reworked to approximately 0.030″ thickness so that strips 6″ x ½″ could be cut for heat stability tests. The slabs were inserted in a press, preheated for approximately 5 minutes and then molded for about 3 minutes at 355° F. Heat distortion bars measuring 5″ x 2″ x ⅛″ were cut from the slabs and tested edgewise at 264 p.s.i.g. fiber stress on 4″ supports. The temperature was increased 2° C. per minute and the heat distortion temperature was recorded at the point where the bar had sagged 0.01″ (ASTM 648-56).

Izod (ASTM D 256-56) samples having the dimensions 2½″ x ½″ x ⅛″ were also cut from the slabs.

The 6″ x ½″ strips were cut into 6 parts and heat aged in a circulating air oven at 400° F. Samples were removed at 10, 20, 30, 40, 50 and 60 minutes. The heat stability value of a given sample was based on the length of time at which the sample could be exposed at 400° F. before appreciable blackening occurred.

The results of the foregoing tests are given below. The control recipe was prepared as described above with the single exception that the chlorinated polyethylene was absent. The control recipe handled poorly on the mill. The polyethylene used as starting material in each case is given the letter (A–I) designation used above.

| Chlorinated Poly-ethylene | Chlorine Level (wt. percent) | Heat Stability at 400° F. (min.) | Heat Distortion ° C. | Izod Impact, ft.-lb./inch of notch |
|---|---|---|---|---|
| Chlorinated PVC (control) | | 35 | 114.5 | 0.94 |
| A | 30 | 40 | 112 | 2.13 |
|   | 35 | 40 | 112 | 4.46 |
|   | 46 | 30 | 109 | 2.25 |
| B | 31 | 30 | 108.5 | 2.46 |
|   | 35 | 30 | 110 | 5.46 |
|   | 46 | 35 | 111.3 | 1.77 |
| D | 34 | 35+ | 109.3 | 3.27 |
|   | 35 | 35+ | 111.0 | 2.34 |
|   | 48 | 40 | 108.0 | 1.24 |
| C | 29 | 40 | 110.0 | 4.76 |
|   | 34 | 35+ | 109.3 | 1.95 |
|   | 42 | 35+ | 108.5 | 3.87 |
| E | 33 | 40 | 113 | 3.40 |
|   | 37 | 30 | 111.5 | 3.38 |
|   | 47 | 30 | 110.3 | 2.62 |
| I | 31 | 30 | 113.3 | 2.77 |
|   | 35 | 35 | 112.8 | 3.47 |
|   | 49 | 30 | 108.0 | 1.13 |
| G | 30 | 30 | 109.0 | 2.01 |
|   | 34.5 | 30 | 107.5 | 1.75 |
|   | 45 | 30 | 107.5 | 0.91 |
| H | 32 | 35 | 110.5 | 3.08 |
|   | 35 | 30 | 107.8 | 1.82 |
|   | 47 | 30 | 105.5 | 0.94 |
| F | 32 | 30 | 107.3 | 1.93 |
|   | 35.5 | 30 | 107.3 | 0.95 |
|   | 47 | 30 | 106.8 | 0.56 |

The "extrudability," that is the speed with which a material extrudes at a set temperature through a standard die when a standard pressure is applied, as well as the appearance of the surface of the extrudate, was determined for numerous compounds of the foregoing types. In general the best extrudability was found for compounds having about 7 parts of the chlorinated polyethylene in them. Compounds of this type wherein the density of the chlorinated polyvinyl chloride was from about 1.55 to 1.58 had the best extrudability. Compositions of the foregoing type containing chlorinated polyvinyl chloride having densities above about 1.60 had very slow extrusion rates. Chlorinated polyethylene F gave compositions which were the poorest in extrudability performance. Likewise, the use of heterogeneously chlorinated polyethylene in the foregoing compositions leads to poor extrudability.

A blend of 5 parts of the homogeneously chlorinated polyethylene (A) containing 35% by weight of chlorine and 100 parts of polyvinyl chloride prepared in the foregoing manner with the aforementioned stabilizers had a heat distortion of 72.5° C. and an Izod impact of 1.49.

EXAMPLE II

Co-isolated blends of chlorinated polyethylene and chlorinated polyvinyl chloride having various levels of the chlorinated polyethylnee in them were evaluated for Izod impact in the manner described in Example I. The results are listed below:

| Chlorinated Polyethylene | Izod Values—Parts of homogeneously chlorinated polyethylene per hundred parts of chlorinated PVC | |
|---|---|---|
| | 5 | 7.5 |
| A: | | |
| (35% Cl) | 4.5 | 7.1 |
| (37% Cl) | 3.4 | 8.3 |
| B: (35% Cl) | 5.5 | 8.3 |
| D: (34% Cl) | 3.3 | 8.8 |
| C: | | |
| (29% Cl) | 4.8 | 7.3 |
| (42% Cl) | 3.9 | 5.9 |
| E: | | |
| (33% Cl) | 3.4 | 8.7 |
| (37% Cl) | 3.4 | 9.0 |
| I: (35% Cl) | 3.5 | 8.7 |
| H: (32% Cl) | 3.1 | 7.6 |

Levels of 10 parts of homogeneously chlorinated polyethylene and above do show good Izod values but heat distortion temperatures and chemical resistance of the blends change markedly.

EXAMPLE III

A blend of 100 parts of post-chlorinated polyvinyl chloride having a density of 1.57 g./cc. (at 25° C.) which was prepared in the aforementioned manner, 7 parts of homogeneously chlorinated high density polyethylene (A) containing 35% by weight of chlorine, and 3.75 parts of the stabilizers listed in Example I was mill mixed at 310° F. and sheeted off the mill. Samples of the resulting sheet were immersed in several types of liquids according to the ASTM D-541 test. All immersion tests were for 28 days at the temperature indicated in the following tables. The blend before immersion had the following properties:

Tensile Strength, p.s.i., 7,600; Tensile Modulus, p.s.i., 389,000; Durometer "D" Hardness, 83.

*Table 1*
ASTM D-541 IMMERSION TEST, 28 DAYS, 25° C.

| Reagent | Percent weight change | Percent volume change | Tensile, p.s.i. | Tensile modulus, p.s.i. | Durometer "D" hardness |
|---|---|---|---|---|---|
| Butyl alcohol | −0.125 | −0.475 | 7,865 | 394,000 | 83 |
| Hexane | −0.075 | −0.625 | 7,875 | 383,500 | 83 |
| Ethanol | +0.185 | +0.13 | 7,670 | 396,750 | 82 |
| Saturated aqueous NaCl | +0.51 | +0.445 | 7,625 | 380,000 | 82 |
| ASTM #3 oil | +0.03 | −0.405 | 7,805 | 376,750 | 83 |
| Glacial acetic acid | +0.48 | +0.25 | 7,685 | 428,000 | 84 |
| $H_2SO_4$, 98% | −0.115 | −0.14 | 7,740 | 398,000 | 84 |
| $H_2SO_4$, 93½% | −0.14 | −0.12 | 7,880 | 395,500 | 84 |
| Glycerine | −0.07 | −0.605 | 8,100 | 389,500 | 83 |
| $H_2SO_4$, 20% | +0.455 | +0.505 | 7,895 | 403,500 | 82 |
| $H_2SO_4$, 80% | −0.155 | +0.315 | 7,995 | 378,500 | 84 |
| Acetic acid, 20% | +0.54 | +0.59 | 7,840 | 371,500 | 84 |
| Chromic acid, 50% | +0.225 | −0.015 | 7,850 | 390,000 | 84 |
| Conc. Hydrochloric acid | +0.36 | +0.355 | 7,850 | 406,500 | 83 |
| $CCl_4$ | +0.435 | +0.415 | 7,580 | 403,500 | 83 |
| Nitric acid, 70% | +0.295 | +0.25 | 7,750 | 400,500 | 83 |
| Aqueous NaOH, 50% | −0.09 | −0.075 | 7,770 | 417,500 | 84 |
| Aqueous NaOH, 10% | +0.445 | +0.36 | 7,765 | 374,500 | 83 |
| Distilled water | +0.71 | +0.685 | 7,795 | 388,500 | 83 |

*Table 2*
ASTM D-541 IMMERSION TEST, 28 DAYS, 140° F.

| Reagent | Percent weight change | Percent volume change | Tensile, p.s.i. | Tensile modulus, p.s.i. | Durometer "D" hardness |
|---|---|---|---|---|---|
| Butyl alcohol | +0.37 | +0.62 | 7,490 | 401,500 | 83 |
| Glacial acetic acid | +7.37 | +9.28 | 6,075 | 322,000 | 78 |
| Glycerine | −0.015 | +0.035 | 7,905 | 401,000 | 83 |
| Chromic acid, 50% | +0.50 | +0.63 | 7,915 | 368,500 | 83 |
| Conc. Hydrochloric acid | +1.41 | +1.63 | 7,850 | 366,500 | 83 |
| Nitric acid, 70% | +1.915 | +1.63 | 7,780 | 369,000 | 83 |
| Aqueous NaOH, 10% | +0.785 | +1.025 | 8,220 | 397,500 | 83 |
| $H_2SO_4$, 93½% | +0.06 | +0.105 | 7,930 | 393,000 | 84 |
| $H_2SO_4$, 80% | −0.025 | +0.15 | 7,930 | 438,200 | 83 |
| $H_2SO_4$, 98% | +0.50 | +0.52 | 8,135 | 419,500 | 83 |
| Acetic acid, 20% | +1.18 | +1.68 | 8,130 | 426,750 | 83 |
| Ethanol | +0.85 | +1.30 | 7,635 | 387,000 | 82 |
| $H_2SO_4$, 20% | +0.80 | +1.05 | 7,905 | 394,250 | 83 |
| Saturated aqueous NaCl | +0.775 | +0.74 | 8,090 | 397,500 | 82 |
| ASTM #3 oil | −0.045 | +0.135 | 7,835 | 419,250 | 83 |
| Hexane | +1.30 | +3.015 | 7,175 | 405,000 | 78 |
| Distilled water | +1.405 | +1.56 | 7,910 | 381,500 | 80 |

*Table 3*
ASTM D-541 IMMERSION TEST, 28 DAYS, 185° F.

| Reagent | Percent weight change | Percent volume change | Tensile, p.s.i. | Tensile modulus, p.s.i. | Durometer "D" hardness |
|---|---|---|---|---|---|
| ASTM #3 oil | −0.065 | +0.38 | 8,125 | 394,000 | 83 |
| Glycerine | −0.11 | +0.23 | 8,030 | 415,750 | 84 |
| Butyl alcohol | +7.12 | +12.56 | 6,235 | 360,000 | 75 |
| Saturated aqueous NaCl | +0.64 | +0.85 | 8,260 | 389,500 | 83 |
| Glacial acetic acid | +12.22 | +15.415 | 4,930 | 312,000 | 78 |
| $H_2SO_4$, 20% | +0.985 | +1.30 | 8,370 | 389,750 | 84 |
| Nitric acid, 70% | +4.995 | +3.35 | 8,245 | 392,500 | 83 |
| $H_2SO_4$, 93½% | +2.55 | +3.09 | 6,680 | 360,000 | 84 |
| $H_2SO_4$, 80% | −0.12 | +0.065 | 8,135 | 373,000 | 83 |
| Chromic acid, 50% | +0.43 | +0.83 | 8,295 | 393,000 | 83 |
| Acetic acid, 20% | +3.65 | +4.955 | 8,025 | 374,500 | 82 |
| Aqueous NaOH, 20% | +1.91 | +2.30 | 8,380 | 387,500 | 83 |
| Aqueous NaOH, 50% | −0.005 | +0.57 | 7,450 | 369,000 | 84 |
| Distilled water | +2.05 | +2.72 | 8,460 | 402,500 | 82 |

Table 4
ASTM D-541 IMMERSION TEST, 28 DAYS, 212° F.

| Reagent | Percent weight change | Percent volume change | Tensile, p.s.i. | Tensile modulus, p.s.i. | Durometer "D" hardness |
|---|---|---|---|---|---|
| ASTM #3 oil | +1.195 | +2.425 | 8,310 | 406,500 | 84 |
| Saturated aqueous NaCl | +1.21 | +1.52 | 8,305 | 371,000 | 84 |
| Glacial acetic acid | +12.67 | +16.015 | 4,190 | 300,500 | 77 |
| Nitric acid, 70% | +0.765 | −0.355 | 1,990 | 379,000 | 85 |
| Glycerine | −0.14 | +0.44 | 8,335 | 409,500 | 84 |
| Chromic acid, 50% | +0.38 | +0.735 | 8,500 | 376,000 | 83 |
| Aqueous NaOH, 50% | −0.07 | +0.55 | 8,430 | 479,000 | 83 |
| Acetic acid, 20% | +6.58 | +9.34 | 7,725 | 446,000 | 80 |
| $H_2SO_4$, 20% | +1.555 | +2.145 | 8,815 | 436,500 | 82 |
| $H_2SO_4$, 93½% | +4.585 | +8.205 | 6,090 | 300,000 | 80 |
| $H_2SO_4$, 80% | −0.16 | +0.165 | 8,500 | 432,000 | 84 |
| Aqueous NaOH, 10% | +2.645 | +3.24 | 8,480 | 436,500 | 83 |

A blend of 7 parts of homogeneously chlorinated polyethylene (A) and 100 parts of polyvinyl chloride prepared and stabilized as described in Example 1 had a tensile of 6000 p.s.i. When this composition was immersed in strongly oxidizing liquids such as 70% nitric acid, 50% chromic acid and 98% sulfuric acid at 140° F. for 14 days considerable swelling and degradation had occurred which demonstrates the decided superiority of the compositions embodied herein.

We claim:

1. The composition comprising a mixture of 100 parts by weight of a post-chlorinated polyvinyl chloride characterized by having a heat distortion temperature, as measured by ASTM Test Method D–648, which is at least 20° C. higher than that of unchlorinated polyvinyl chloride, and from 2 to 8 parts by weight of a homogeneously chlorinated polymer of at least one aliphatic alpha-olefin said alpha-olefin having a chain length no greater than 8 carbon atoms and said polymer having a melt index value above about 0.05, the mixture characterized in that it is extrudable into pipe suitable for conveying water at a temperature within the range of about 85° C. to 120° C.

2. The composition comprising a mixture of 100 parts by weight of a post-chlorinated polyvinyl chloride characterized by having a heat distortion temperature, as measured by ASTM Test Method D–648, which is at least 20° C. higher than that of unchlorinated polyvinyl chloride, and from 5 to 8 parts by weight of a homogeneously chlorinated polymer of ethylene, said polymer having a melt index value above about 0.05, the mixture characterized in that it is extrudable into pipe suitable for conveying water at a temperature within the range of about 85° C. to 120° C.

3. The composition comprising a mixture of 100 parts by weight of a post-chlorinated polyvinyl chloride having a density of from 1.53 to 1.59 grams per cc. at 25° C. and a heat distortion temperature, as measured by ASTM Test Method D–648, within the range of 95° C. to about 125° C., and from 5 to 8 parts by weight based on the weight of said post-chlorinated polyvinyl chloride of a homogeneously chlorinated polyethylene containing from 25 to 50% by weight of chlorine, the mixture characterized in that it is extrudable into pipe suitable for conveying water at a temperature within the range of about 90° to 120° C.

4. The composition comprising a mixture of 100 parts by weight of a post-chlorinated polyvinyl chloride having a density of from 1.53 to 1.59 grams per cc. at 25° C. and a heat distortion temperature, as measured by ASTM Test Method D–648, within the range of 95° C. to about 125° C., and from 5 to 8 parts by weight of a homogeneously chlorinated low pressure, high density polyethylene containing from 25 to 50% by weight of chlorine, the mixture characterized in that it is extrudable into pipe suitable for conveying water at a temperature within the range of about 90° C. to 120° C.

5. The composition comprising a mixture of 100 parts by weight of a post-chlorinated polyvinyl chloride having a density of from 1:55 to 1.58 grams per cc. at 25° C. and a heat distortion temperature, as measured by ASTM Test Method D–648, within the range of 95° C. to about 125° C., and from 5 to 8 parts by weight of a homogeneously chlorinated low pressure polyethylene containing from 30 to 40% by weight of chlorine, said polyethylene having an initial density of from 0.926 to 0.965 grams per cc. at 23° C., the mixture characterized in that it is extrudable into pipe suitable for conveying water at a temperature within the range of about 90° C. to 120° C.

6. The composition comprising a mixture of 100 parts by weight of a post-chlorinated polyvinyl chloride having a density of from 1.55 to 1.58 grams per cc. at 25° C. and a heat distortion temperature, as measured by ASTM Test Method D–648, of at least 100° C., and from 5 to 8 parts by weight of a homogeneously chlorinated low pressure polyethylene containing from 30 to 40% by weight of chlorine said polyethylene having an initial density of from 0.941 to 0.965 grams per cc. at 23° C., the mixture characterized in that it is extrudable into pipe suitable for conveying water at a temperature of at least 95° C.

7. The composition comprising a mixture of 100 parts by weight post-chlorinated polyvinyl chloride characterized by having a heat distortion temperature as measured by ASTM Test Method D–648 which is at least 20° higher than that of the unchlorinated polyvinyl chloride and a density of from 1.53 to 1.59 grams/cc. at 25° C., and from 2 to 8 parts by weight of a homogeneously chlorinated polyethylene, said polyethylene having a melt index value above 0.05 and containing from 25 to 50% by weight of chlorine, the mixture characterized in that it is extrudable into pipe suitable for conveying water at a temperature within the range of about 85° C. to 120° C.

References Cited by the Examiner

UNITED STATES PATENTS 2,592,763 4/1952 Taylor _____ 260—897
2,996,489 8/1961 Dannis et al. _____ 260—31.8
3,006,889 10/1961 Frey _____ 260—897

FOREIGN PATENTS 1,225,358 6/1960 France.

MURRAY TILLMAN, *Primary Examiner.*

LEON J. BERCOVITZ, *Examiner.*

D. ARNOLD, R. N. COE, J. A. KOLASCH, G. F. LESMES, *Assistant Examiners.*

UNITED STATES PATENT OFFICE
CERTIFICATE OF CORRECTION

Patent No. 3,299,182 January 17, 1967

Garland B. Jennings et al.

It is hereby certified that error appears in the above numbered patent requiring correction and that the said Letters Patent should read as corrected below.

Column 10, line 21, for "1:55" read -- 1.53 --; same line 21, for "1.58" read -- 1.59 --.

Signed and sealed this 21st day of November 1967.

(SEAL)
Attest:

Edward M. Fletcher, Jr.

Attesting Officer

EDWARD J. BRENNER

Commissioner of Patents